United States Patent [19]
Berger et al.

[11] 3,901,863
[45] Aug. 26, 1975

[54] POLYMERIZATION OF OLEFINS

[75] Inventors: Eugene Berger; Jean-Louis Derroitte, both of Brussels, Belgium

[73] Assignee: Solvay & Cie, Brussels, Belgium

[22] Filed: Dec. 6, 1972

[21] Appl. No.: 312,744

[30] Foreign Application Priority Data
Dec. 8, 1971 Luxembourg............................ 64420
June 1, 1972 Luxembourg............................ 65445

[52] U.S. Cl. ...... 260/88.2 R; 260/88.2 B; 260/93.7; 260/94.9 DA; 260/94.9 E
[51] Int. Cl. ............................................... C08f 1/42
[58] Field of Search ... 260/88.2 R, 94.9 DA, 94.9 E

[56] References Cited
UNITED STATES PATENTS

| | | | |
|---|---|---|---|
| 3,326,877 | 6/1967 | Orzechowski et al. | 260/94.9 DA |
| 3,518,237 | 6/1970 | Duck et al. | 260/94.9 E |
| 3,676,415 | 7/1972 | Diedrich et al. | 260/94.9 DA |
| 3,687,910 | 8/1972 | Jones | 260/94.9 E |
| 3,718,636 | 2/1973 | Stevens et al. | 260/94.9 DA |

FOREIGN PATENTS OR APPLICATIONS
7,113,010  4/1972  Netherlands................ 260/94.9 DA Primary Examiner—Joseph L. Schofer
Assistant Examiner—A. Holler
Attorney, Agent, or Firm—Pennie & Edmonds

[57] ABSTRACT

The present invention relates to the method of polymerizing olefinic monomers utilizing a solid catalyst composition comprising a solid catalytic complex and an activator, to the resultant high impact resistant polymers, to the method of making such catalytic complex, and to the catalytic complex; said catalytic complex comprising the reaction product of an organic oxygenated compound of a metal of groups Ia, IIa, IIb, IIIb, IVb, VIIa, and VIII of the Periodic Table, an organic oxygenated transition compound of a transition metal of groups IVa, Va, and VIa of the Periodic Table, and an aluminium halide.

15 Claims, No Drawings

POLYMERIZATION OF OLEFINS

BACKGROUND OF THE INVENTION

It is known that one can use for the low-pressure polymerization of olefins catalytic systems containing a compound of a transition metal and an organo-metallic compound.

It is also known from Belgian Pat. No. 705,220 that one can use as compound of the transition metal of the catalytic systems mentioned above a solid obtained by reacting a halogenated compound of a transition metal with an oxygenated compound of a divalent metal such as magnesium. The catalytic systems thus obtained are very active if they are compared with those in which the halogenated compound of a transition metal is used as it is.

In Belgian Pat. No. 767,586, catalytic systems are described, one of the components of which is prepared by reacting an organic oxygenated compound of a divalent metal with an alkylaluminium halide, separating the product of this reaction and reacting it then with a halogenated compound of a transition metal. These catalytic systems are also characterized by a high activity.

However, such catalytic systems with a high activity and others of the prior art lead to polymers which have an important defect. In point of fact, while their physical properties and more particularly their mechanical properties are on the whole quite satisfactory, their resistance to impact is sometimes insufficient. Now, the resistance to impact is an essential quality for polyolefins because they are used mainly for manufacturing objects which are used for handling (crates, tanks, pallets) and packing (bottles, films) which are subject to impact when they are used.

SUMMARY OF THE INVENTION

It has now been found that the use of a new type of catalytic complex for the low-pressure polymerization of olefins makes it possible to manufacture, with very high activities, polyolefins which possess a very good resistance to impact.

The present invention relates to the method of polymerizing olefinic monomers utilizing a solid catalyst composition comprising a solid catalytic complex and an activator, to the resultant high impact resistant polymers, to the method of making such catalytic complex, and to the catalytic complex; said catalytic complex comprising the reaction product of an organic oxygenated compound of a metal of groups Ia, IIa, IIb, IIIb, IVb, VIIa, and VIII of the Periodic Table, an organic oxygenated transition compound of a transition metal of groups IVa, Va and VIa of the Periodic Table, and an aluminum halide.

DETAILED DESCRIPTION

The solid catalytic complexes of the present invention are prepared from organic oxygenated compounds of metals of Groups Ia, IIa, IIb, IIIb, IVb, VIIa and VIII of the Periodic Table. Among these metals one may mention by way of example lithium, sodium, potassium, magnesium, calcium, zinc, boron, aluminum, silicon, tin, manganese, iron, cobalt and nickel. However, it is preferable to use organic oxygenated compounds of divalent metals such as magnesium, calcium, zinc, manganese, iron, nickel, cobalt, tin and the like. Good results are also obtained with organic oxygenated compounds of aluminum and silicon. The best results are obtained with the oxygenated organic compounds of magnesium and these are preferred. As used herein the term "oxygenated organic compounds" is intended to mean all the compounds in which any organic radical is attached to the metal via oxygen; that is to say, compounds containing at least one sequence of metal-oxygen-organic radical bonds per atom of metal. The best results are obtained when the metallic bonds of the organic oxygenated compounds only comprise sequences of metal-oxygen-organic radical bonds.

However, the organic oxygenated compounds used in the invention may contain, in addition to the organic radicals attached to the metal via oxygen, other radicals but to the exclusion of halide radicals, that is to say the fluoride, chloride, bromide and iodide radicals. These other radicals are preferably oxygen and the inorganic radicals attached to the metal via oxygen such as the $-OH$, $-(SO_4)_{\frac{1}{2}}$, $-NO_3$, $-(PO_4)_{\frac{1}{3}}$, $-(CO_3)_{\frac{1}{2}}$ and $-ClO_4$ radicals. They may also be organic radicals attached directly to the metal by carbon.

The organic radicals attached to the metal via oxygen are of any type. They are selected preferably from among the radicals containing 1 to 20 carbon atoms and more particularly from among those containing 1 to 6 carbon atoms. These radicals may be saturated or unsaturated, with branched chains, straight chains or cyclic; they may also be substituted and/or contain hetero atoms such as O, S, N, P ... in their chain. They are selected in particular from among the alkyl, alkenyl, aryl, cycloalkyl, arylalkyl, alkylaryl, acyl, aroyl radicals and their substituted derivatives.

Among the organic oxygenated compounds which can be used within the scope of the invention, one may mention:

1. The alkoxides such as methylates, ethylates, isopropylates, n-butylates, isobutylates, methoxyethylates and hydroxymethylates;
2. phenates such as salts of phenic acid, naphthenates, anthracenates, phenanthrenates and cresolates;
3. the salts of carboxylic acids such as acetates, butanoates, laurates, pivalates, crotonates, phenylacetates, benzoates, malonates, adipates, sebacates, phthalates, mellitates, acrylates, oleates and maleates;
4. the chelates (that is to say organic oxygenated compounds in which the metal possesses at least one sequence of normal bonds of the metal-oxygen-organic radical type and at least one coordination bond so as to form a heterocycle in which the metal is included), such as the enolates and in particular the acetyl acetonates as well as the complexes obtained from phenolic derivatives possessing an electron donor group in the ortho position in relation to the hydroxyl group and in particular the complexes of 8-hydroxyquinolein; and
5. the organic nitrogenated oxygenated compounds (that is to say compounds containing sequences of metal-oxygen-nitrogen-organic radical bonds) such as the oximates and in particular butyloximates, dimethylglyoximates and cyclohexyloximates, the salts of hydroxamic acids and the salts of hydroxylamines and in particular the derivatives of N-nitroso-N-phenylhydroxylamine.

However, it is preferable to use alkoxides and phenates and more particularly those derived from divalent metals (preferably magnesium) which only possess sequences of divalent metal-oxygen-organic radical bonds.

The use of the organic oxygenated compounds containing several different organic radicals also falls within the scope of the invention. The same applies to the use of a number of different organic oxygenated compounds of one and the same metal.

Likewise one may use several organic oxygenated compounds of different metals. In this case, these compounds may be used in the form of mixed complex compounds or again seperately. A particularly advantageous form of embodiment of the invention consists in using jointly an organic oxygenated compound of a metal of Group IIa (preferably magnesium) and an organic oxygenated compound of a metal of groups IIIb and IVb (preferably silicon and more particularly aluminium).

In order to prepare the catalytic complexes used in the invention one also uses organic oxygenated transition compounds of transition metals of groups IVa, Va and VIa of the Periodic Table.

Among these metals it is preferred to use titanium, zirconium and vanadium. The best results are obtained with titanium.

By "organic oxygenated transition compounds" as such term is used herein, it is intended to mean compounds in which an organic radical is attached to the transition metal via oxygen. The compounds containing other radicals than the organic radicals attached to the transition metal via oxygen and in particular compounds containing halide radicals (fluoride, chloride, bromide and iodide) are excluded from the scope of the present invention. However, compounds containing metal-oxygen bonds and condensed compounds containing sequences of metal-oxygen-metal bonds may also be used provided they have at least one sequence of metal-oxygen-organic radical bonds per molecule.

The organic radicals attached to the transition metal via oxygen may be of any kind. They generally comprise from 1 to 20 carbon atoms and preferably 1 to 10 carbon atoms. The best results are obtained when they contain 1 to 6 carbon atoms. The organic radicals are preferably selected from among the hydrocarbon radicals and particularly from among the alkyl radicals (linear or branched), cycloalkyl radicals, arylalkyl radicals, aryl radicals and alkylaryl radicals.

The organic oxygenated transition compounds are represented by the general formula $[TrO_x(OR)_y]_m$ in which Tr is a transition metal of groups IVa, Va and VIa of the Periodic Table, in which R is an organic radical as defined above, in which $x$ and $y$ are any numbers such that $x \geq 0$ and $y > 0$ and are compatible with the valency of the transition metal and in which $m$ is an integer. It is preferable to use organic oxygenated transition compounds in which $x$ is such that $0 \leq x \leq 1$ and $m$ is such that $1 \leq m \leq 6$.

Among the organic oxygenated transition compounds which can be used within the scope of the present invention, one may mention:

1. the alkoxides such as $Ti(OiC_3H_7)_4$, $Ti(OiC_4H_9)_4$, $V(OiC_3H_7)_4$ and $Zr(OiC_3H_7)_4$;
2. the phenates such as $Ti(OC_6H_5)_4$;
3. the oxyalkoxides such as $VO(OiC_3H_7)_3$;
4. the condensed alkoxides such as $Ti_2O(OiC_3H_7)_6$; and
5. the enolates such as titanium acetylacetonate.

The use of organic oxygenated transition compounds containing several different organic radicals also falls within the scope of the present invention. The same applies to the use of several different organic oxygenated transition compounds of one and the same transition metal and the use of a number of organic oxygenated transition compounds of different metals.

The third component used for preparing the catalytic complexes is an aluminium halide. One preferably chooses it from among the halides of aluminium of the general formula $AlR_nR'_{3-n}$ in which R is a hydrocarbon radical containing 1 to 20 carbon atoms and preferably 1 to 6 carbon atoms, R' is a halide which may be fluoride, chloride, bromide or iodide and $n$ is any number such that $0 \leq n < 3$. Preferably R is selected from among the alkyl (linear or branched), cycloalkyl, arylalkyl, aryl and alkylaryl radicals. The best results are obtained when R' represents chlorine and $n$ is such that $0 \leq n \leq 2$ and preferably such that $1 \leq n \leq 2$.

Examples of preferred halides of aluminum which can be used in the invention are $AlCl_3$, $Al(C_2H_5)Cl_2$, $Al_2(C_2H_5)_3Cl_3$ and $Al(C_2H_5)_2Cl$.

One may also use any number of other aluminium halides.

In order to carry out the reaction of the formation of the complex, the organic oxygenated compound, the organic oxygenated transition compound and the aluminium halide may be used in the solid state, for example in suspension in an inert diluent or in the form of dry particles; in the liquid state, when the conditions of operation permit it; in the form of a solution; and in the form of a vapor or gas.

It is preferable to carry out the reaction of the formation of the solid complex in a liquid medium. In order to do this, the reaction can be carried out in the presence of a diluent. In such case the diluent selected is preferably one in which at least one of the reagents is soluble. Any of the solvents usually used in organic chemistry may be employed. However, it is preferable to use alkanes and cycloalkanes containing from 4 to 20 carbon atoms, such as isobutane, normal pentane, normal hexane, cyclohexane, methylcyclohexane and the dodecanes. One may also use the alcohols containing 1 to 12 carbon atoms per hydroxyl group, such as ethanol, butanol and cyclohexanol. When a diluent is used, it is preferable for the total concentration of the dissolved reagent or reagents to be greater than 5 percent by weight and preferably greater than 20 per cent by weight, based on the weight of the diluent.

The reaction can also be carried out in a liquid medium in the absence of diluent, and this constitutes a preferred mode of embodiment of the invention, by choosing conditions of temperature and pressure such that at least one of the reagents is in the liquid state. Preferably one operates under conditions such that the organic oxygenated transition compound is liquid. In practice, it frequently happens that this organic oxygenated transition compound when maintained in the liquid state is capable of dissolving the organic oxygenated compound. One may also use a second organic oxygenated compound which is liquid and capable of dissolving the former.

The temperature at which the reaction is carried out is not critical. It is generally chosen such that at least one of the reagents is liquid or dissolved. For reasons of convenience, it is preferable to operate at between 20° and 300°C and more particularly between 50° and 200°C. The pressure is also not critical; one generally operates in the vicinity of atmospheric pressure. So as to favor the homogenization of the reaction medium one generally agitates the medium during the period of reaction.

The order of addition of the reagents may be as desired. However, it is preferable to operate by one of the following methods:

1. The organic oxygenated compound is brought into contact with the organic oxygenated transition compound by adding one to the other or by mixing them gradually. In practice it frequently happens that in this way a complex is formed which is liquid or soluble in the diluent. The aluminum halide is then gradually added.

2. The organic oxygenated transition compound and the aluminium halide are mixed (preferably rapidly) and then the organic oxygenated compound is added.

3. The three reagents are simultaneously and gradually mixed together. The speed of addition of the reagents is also not critical. It is generally chosen so as not to bring about an abrupt heating of the reaction medium due to the rapid rate of reaction. The reaction may be carried out continuously or discontinuously.

The quantities of organic oxygenated compound, organic oxygenated transition compound and aluminium halide to be preferably used are stated below.

The quantity of the organic oxygenated transistion compound or compounds to be used is defined in relation to the total quantity of the organic oxygenated compound or compounds used. It may vary within wide limits. Generally speaking it is between 0.01 and 10 gram atoms of transition metal present in the organic oxygenated transition compound per gram atom of metal present in the organic oxygenated compound. It has been observed that the productivity of the catalytic complexes of this invention, that is to say the quantity of polymer produced in relation to the quantity of catalytic complex used is maximal when one uses a ratio of between 0.05 and 5 gram atoms of transition metal in the transition compound per gram atom of metal in the oxygenated compound. The best results are obtained when this ratio varies between 0.10 and 2 gram atoms per gram atom. However, when the ratio varies between 0.025 and 0.10 gram atoms per gram atom the specific activity, that is to say the quantity of polymer produced in relation to the quantity of transition metal in the transition compound, is extremely high; on the other hand, the productivity is lower.

The quantity of aluminium halide to be used, reckoned in relation to the total quantity of the organic oxygenated compound or compounds and of the organic oxygenated transition compound or compounds used, may also vary within wide limits. Generally speaking it is between 0.10 and 10 moles of aluminium halide per gram equivalent of metal and transition metal present in all of the organic oxygenated and organic oxygenated transition compounds used. By gram equivalent one means the weight in grams of these metals which is capable of reacting with or replacing one gram atom of hydrogen. Preferably this quantity is between 0.50 and 5 moles per gram equivalent. The best results are obtained when it is between 0.75 and 2 moles per gram equivalent.

When one uses the variant of the invention in which there is used an organic oxygenated compound of a metal A of Group IIa and a second organic oxygenated compound of a metal B of Groups IIIb and IVb, the quantities of these compounds to be used are such that the ratio between the quantity of metal A and that of the metal B is between 0.01 and 100 gram atoms per gram atom. Preferably this ratio is between 0.1 and 10 gram atoms per gram atom. The best results are obtained when it is between 0.5 and 1.5 gram atoms per gram atom.

The catalytic complexes prepared in accordance with the invention are solid. They are insoluble in the solvents, such as alkanes and cycloalkanes which can be used as diluents. They may be used in polymerization in the form in which they are obtained, without being separated from the reaction medium. However, it is preferable to separate them from this reaction medium by any of the known usual means. When the reaction medium is liquid, one may use, for example, filtration, decantation or centrifuging.

After separation, the catalytic complexes may be washed so as to eliminate excess reagents with which they may still be impregnated. For this washing one uses any inert diluent and for example those which can be used as constituents of the reaction medium such as the alkanes and cycloalkanes. After washing, the catalytic complexes may be dried, for example, by sweeping them with a stream of dry nitrogen or in vacuo.

The mechanism of the reaction of the formation of the catalytic complexes of the invention is not known. The elemental analysis of the catalytic complexes after separation and washing shows that they are chemically combined complexes, products of chemical reactions, and not the result of mixtures or adsorption phenomena. In point of fact it is impossible to dissociate one or other of the constituents of these complexes using purely physical means of separation.

The catalytic complexes of the invention, the exact nature of which is also not well known, contain metal, transition metal, aluminium and halogen in variable quantities. More often than not they contain, per kg., between 10 and 150 g of metal from the organic oxygenated compound or compounds, between 20 and 250 g of transition metal, more than 10 g of aluminium and between 200 and 700 g of halogen. They are characterized by a high specific surface area, more often than not greater than 50 sq.m. per gram and which may go up as far as figures as high as 300 to 400 sq.m. per gram.

The catalytic compositions according to the invention also comprise an organic compound which serves as activator. One uses the organic compounds of metals of Groups Ia, IIa, IIb, IIIb and IVb of the Periodic Table such as the organic compounds of lithium, magnesium, zinc, aluminium and tin. The best results are obtained with the organic compounds of aluminium.

It is possible to use completely alkylated compounds whose alkyl chain contains from 1 to 20 carbon atoms and are straight or branched, such as for example n-butyl lithium, diethyl magnesium, diethyl zinc, trimethyl aluminium, triethyl aluminium, triisobutyl aluminium, tri-n-butyl aluminium, tri-n-decyl aluminium, tetraethyl tin and tetrabutyl tin. However, it is preferable to use the trialkyl aluminiums whose alkyl chains contain from 1 to 10 carbon atoms and are either straight or branched.

It is also possible to use the alkyl metal hydrides in which the alkyl radicals also contain from 1 to 20 carbon atoms, such as di-isobutyl aluminium hydride and trimethyl tin hydride. Also suitable are the alkyl halides of metals in which the alkyl radicals also contain from 1 to 20 carbon atoms such as ethyl aluminium sesquichloride, diethyl aluminium chloride and diisobutyl aluminium chloride.

Finally it is also possible to use organo-aluminium compounds obtained by reacting trialkyl aluminium or dialkyl aluminium hydrides whose radicals contain from 1 to 20 carbon atoms with diolefins containing 4 to 20 carbon atoms, and more particularly the compounds known as isoprenyl aluminiums.

The process of the invention is applied to the polymerization of olefins with a terminal unsaturation whose molecule contains from 2 to 20, and preferably 2 to 6, carbon atoms, such as the α-olefins ethylene, propylene, butene-1, 4-methylpentene-1 and hexene-1. It also applies to the copolymerization of these olefins with one another as well as with diolefins preferably containing 4 to 20 carbon atoms. These diolefins may be unconjugated aliphatic diolefins such as hexadiene-1,4, monocyclic diolefins such as 4-vinylcyclohexene, 1,3-divinyl-cyclohexane, cyclopentadiene or cyclooctadiene-1,5, alicyclic diolefins having an endocyclic bridge such as dicyclopentadiene or norbornadiene and conjugated aliphatic diolefins such as butadiene and isoprene.

The process of the invention is applied particularly well to the manufacture of homopolymers of ethylene and copolymers containing at least 90 moles% and preferably 95 moles% of ethylene.

The polymerization may be carried out by any known process such as in solution, or in suspension in a solvent or hydrocarbon diluent, or again in the gaseous phase. For processes in solution or in suspension one uses solvents or diluents analagous to those used for the preparation of the catalytic complex; preferably, alkanes or cycloalkanes such as butane, pentane, hexane, heptane, cyclohexane, methylcyclohexane or mixtures thereof. One may also carry out the polymerization in the monomer or one of the monomers maintained in the liquid state.

The polymerization pressure is generally between atmospheric pressure and 100 kg/cm$^2$, preferably 50 kg/cm$^2$. The temperature is generally selected between 20° and 200°C and preferably between 60° and 120°C. The polymerization may be carried out continously or discontinuously.

The organo-metallic compound and the catalytic complex may be added separately to the polymerization medium. Also, one may bring them into contact at a temperature between −40° and 80°C over a period ranging up to 2 hours before introducing them into the polymerization reactor. They can also be brought into contact with one another in several stages or again one may add one part of the organo-metallic compound before the reactor or again one may add several different organo-metallic compounds.

The total quantity of organo-metallic compound used is not critical; it is generally between 0.02 and 50 mmoles per dm$^3$ of solvent, diluent or reactor volume and preferably between 0.2 and 5 mmoles per dm$^3$.

The quantity of catalytic complex used is determined according to the transition metal content of the catalytic complex. It is generally chosen so that the concentration is between 0.001 and 2.5 and preferably between 0.01 and 0.25 m. gram atoms of metal per dm$^3$ of solvent, diluent or reactor volume.

The ratio of the quantities of organo-metallic compound and catalytic complex is also not critical. It is generally chosen so that the ratio of organo-metallic compound/transition metal expressed in mole/gram atom is greater than 1 and preferably greater than 10.

The mean molecular weight based on the melt index of the polymers manufactured according to the process of the invention may be regulated by the addition to the polymerization medium of one or more molecular weight modifiers such as hydrogen, zinc, or diethyl cadmium, alcohols or carbon dioxide.

The specific gravity of the homopolymers produced according to the process of the invention can also be regulated by the addition to the polymerization medium of an alkoxide of a metal of groups IVa and Va of the Periodic Table. Thus one may produce polyethylenes with a specific gravity intermediate between that of the polyethylenes manufactured by a high-pressure process and that of the classic high-density polyethylenes.

Among the alkoxides which are suitable for this regulation, those of titanium and vanadium whose radicals contain 1 to 20 carbon atoms each are particularly effective. One may mention among them Ti(OCH$_3$)$_4$, Ti(OC$_2$H$_5$)$_4$, Ti[OCH$_2$CH(CH$_3$)$_2$]$_4$, Ti(OC$_8$H$_{17}$)$_4$ and Ti(OC$_{16}$H$_{33}$)$_4$.

The process of the invention makes it possible to produce polyolefins with remarkably high productivities. Thus in the homopolymerization of ethylene, the productivity expressed in grams of polyethylene per gram of catalytic complex used usually exceeds 10,000 and in many cases 20,000. The activity reckoned on the quantity of transition metal present in the catalytic complex is also very high. In the homopolymerization of ethylene also, expressed in grams of polyethylene per gram of transition metal used, it regularly exceeds 50,000 and in many cases 100,000. In the most favorable cases it is greater than 1,000,000.

For this reason, the content of catalytic residues of the polymers produced according to the process of the invention is extremely low. More particularly, the residual content of transition metal is extremely low. It is the derivatives of transition metals which are troublesome in the catalytic residues because of the colored complexes which they form with the phenolic antioxidants usually employed in polyolefins. That is why, in the classic processes for the polymerization of olefins by means of catalysts containing a transition metal compound, the polymers have to be purified to remove the catalytic residues which they contain, for example by a treatment with alcohol. In the process of the invention, the content of troublesome residues is so low that one may dispense with the purification treatment which is a costly operation in terms of raw materials, time, and capital.

The polyolefins produced according to the invention are characterized by a remarkably high resistance to impact. Thus the homopolymers of the ethylene manufactured according to the invention, when their melt index is about 5, possess a resistance to impact measured by the Izod test of at least about 10 kg cm/cm notch. The polyethylenes of the same melt index manufactured by means of high-activity catalytic systems of prior art do not have a resistance impact measured according to the same test which is greater than approximately 6 kg cm/cm notch.

The polyolefins obtained by the process of the invention may be used according to all known fabricating techniques such as extrusion, injection, blow extrusion or rolling for example. They may be used advantageously for applications where a good resistance to impact is required and in particular for manufacturing crates, tubs, pallets and bottles.

The examples which follow are intended to illustrate the invention and in no way restrict it.

EXAMPLES 1 to 5

Magnesium ethylate, $Mg(OC_2H_5)_2$, titanium tetrabutylate, $Ti(On-C_4H_9)_4$, and ethyl aluminium dichloride $Al(C_2H_5)Cl_2$ are reacted as follows:

114 g of magnesium ethylate was added to 170 g of titanium tetrabutylate and the mixture heated to 170°C with agitation for 2½ hours. There was almost complete dissolution of the magnesium ethylate. In the mixture the atomic ratio of Ti/Mg was 0.5 gram atom/gram atom ± 10% error due to impurities contained by the reagents.

To the mixture thus made and previously cooled to ambient temperature there was added 400 mls of hexane at 20°C and then, gradually, varying quantities of ethyl aluminium dichloride in the form of a solution in hexane containing 400 g/litre.

An exothermic reaction occurred with the formation of the catalytic complex in the form of a precipitate.

The catalytic complex thus formed was separated by filtration and washed with hexane. It was then dried in vacuo at 70°C until its weight was constant.

Varying quantities of catalytic complex and 200 mg. of triisobutyl aluminium were introduced into a 1.5-litre autoclave containing 0.5 litres of hexane. The temperature of the autoclave was then brought to about 85°C. Ethylene was introduced under a partial pressure of 10 $kg/cm^2$ and hydrogen under a partial pressure of 4 $kg/cm^2$.

The polymerization was continued for 1 hour with agitation, maintaining the total pressure constant by the continuous addition of ethylene. After 1 hour the autoclave was degassed and the polyethylene thus produced collected.

Table 1 shows the particular conditions for each experiment and also the results obtained. The ratio Al/Mg + Ti represents the number of moles of ethyl aluminium dichloride used per gram equivalent of magnesium and titanium present in the mixture. This ratio is also accurate to within ± 10%.

The results shown in Table 1 show that the productivity of the catalytic complexes (weight of polymer obtained per gram of complex used) and their specific activity (weight of polymer obtained per hour, per gram of transition metal used and per $kg/cm^2$ of ethylene) vary according to the ratio Al/Mg + Ti defined above. They are maximum for values of this ratio of between 0.75 and 2 moles/gram equivalent.

TABLE 1

|  |  | Ex. 1 | Ex. 2 | Ex. 3 | Ex. 4 | Ex. 5 |
|---|---|---|---|---|---|---|
| Quantity of $Al(C_2H_5)Cl_2$ used. | g | 159 | 318 | 635 | 879 | 1270 |
| Al/Mg + Ti ratio | mole/g.-eq | 0.31 | 0.62 | 1.25 | 1.75 | 2.50 |
| Elementary analysis of the catalytic complex |  |  |  |  |  |  |
| magnesium | mg/g | 90 | 96 | 105 | 88 | 29 |
| titanium | mg/g | 76 | 92 | 113 | 114 | 202 |
| aluminium | mg/g | 48 | 41 | 36 | 40 | 49 |
| chlorine | mg/g | 263 | 384 | 573 | 603 | 563 |
| Specific surface area of the catalytic complex | $m^2/g$ | 19 | 22 | 273 | 339 | 221 |
| Quantity of catalytic complex used | mg | 27 | 11 | 5 | 5 | 12 |
| Quantity of polyethylene obtained | g | 32 | 65 | 138 | 127 | 121 |
| Productivity gPE/g complex |  | 1200 | 5900 | 27.600 | 25.400 | 10.100 |
| Specific activity gPE/hr × g Ti × $kg/cm^2$ $C_2H_4$ |  | 1600 | 6400 | 24.400 | 22.300 | 5.000 |
| Fluidity index of the PE g/10 mins (ASTM Standard D 1238-57 T) |  | 0.20 | 0.77 | 1.06 | 0.56 | 0.27 |

EXAMPLES 6 to 8

The catalytic complex was prepared as described for Examples 1 to 5, except that varying quantities of titanium tetrabutylate and ethyl aluminium dichloride were used.

The polymerization was also carried out under the same conditions as in Examples 1 to 5.

Table 2 shows the particular conditions for each experiment as well as the results obtained.

The results shown in Table 2 as well as those of Examples 4, 9 and 10, show that the productivity of the catalytic complexes according to the invention seem to be maximum for values of the atomic ratio Ti/Mg between 0.10 and 2.

TABLE 2

|  |  | Ex. 6 | Ex. 7 | Ex. 8 |
|---|---|---|---|---|
| Quantity of $Ti(On-C_4H_9)_4$ used | g | 85 | 340 | 680 |
| Atomic ratio Ti/Mg | g-at/g-at | 0.25 | 1 | 2 |
| Quantity of $Al(C_2H_5)Cl_2$ used | g | 635 | 1270 | 2540 |
| Ratio Al/Mg + Ti | mole/g-eq | 1.66 | 1.66 | 2 |
| Elementary analysis of the catalytic complex |  |  |  |  |
| magnesium | mg/g | 104 | 50 | 23 |
| titanium | mg/g | 76 | 165 | 216 |
| aluminium | mg/g | 43 | 36 | 23 |
| chlorine | mg/g | 616 | 593 | 495 |
| Specific surface area of the catalytic complex | $m^2/g$ | 340 | 320 | 249 |
| Quantity of catalytic complex used | mg | 4 | 5 | 6 |
| Quantity of polyethylene obtained | g | 131 | 130 | 66 |
| Productivity | gPe/g complex | 32.800 | 26.000 | 11.000 |
| Specific activity gPE/hr × g Ti × $kg/cm^2$ $C_2H_4$ |  | 43.000 | 15.750 | 5.100 |
| Fluidity index of the PE | g/10 mins | 0.37 | 0.34 | 0.09 |

EXAMPLE 9

The same reagents as in Examples 1 to 5 were used. A mixture containing 100 mls. of hexane, 15 g of magnesium ethylate, and 4.5 g of titanium tetrabutylate was maintained under agitation and at boiling point (approximately 69°C) for 0.75 hours. In this mixture the atomic ratio Ti/Mg was 0.10 gram atom/gram atom.

To the mixture thus obtained there was added 75 g of ethyl aluminium dichloride in the form of a solution at the rate of 400 g/litre in hexane. This mixture was heated with agitation and under a reflux (approximately 73°C) for 1 hour. The Al/Mg + Ti ratio of the mixture was 2.10 moles/gram equivalent. A catalytic complex in the form of a precipitate was formed which was separated by filtration. It was then dried in vacuo at 70°C until its weight remains constant.

The elemental analysis of the catalytic complex showed that it contained:

| | |
|---|---|
| magnesium | 219 mg/g |
| titanium | 14 mg/g |
| aluminium | 23 mg/g |
| chlorine | 703 mg/g |

Polymerization was carried out under conditions identical to those of Examples 1 to 5 using 21 mg of catalytic complex.

169 g of polyethylene were collected whose melt index was 0.15 g/10 mins. The productivity was, therefore, 8000 gPE/g catalytic complex and the specific activity 57,500 g PE/hr. × g Ti × kg/cm² $C_2H_4$.

EXAMPLE 10

The same reagents were used as in Examples 1 to 5, except that the titanium tetrabutylate was replaced by titanium tetranonylate of the formula $Ti(OC_9H_{19})_4$.

114 g of magnesium ethylate were added to 87 g of titanium tetranonylate. The mixture was heated to 195°C with agitation for 2½ hours. It was found that there is almost complete dissolution of the magnesium ethylate. In the mixture the Ti/Mg atomic ratio was 0.14 gram atoms/gram atom to within an error of ± 10% due to impurities contained in the reagents.

To this mixture thus made and previously cooled to ambient temperature there was added 1600 mls. of hexane at 20°C and then, gradually, 635 g of ethyl aluminium dichloride in the form of a 400 g/litre solution in hexane.

This mixture was heated with agitation and under a reflux (approximately 69°C) for 0.75 hours. The Al/Mg + Ti ratio of the mixture was 2 moles/gram equivalent. A catalytic complex in the form of a precipitate was formed. It was separated by filtration, washed with hexane, and dried in vacuo at 70°C until its weight remains constant.

The elemental analysis of the catalytic complex thus formed showed that it contained:

| | |
|---|---|
| magnesium | 165 mg/g |
| titanium | 41 mg/g |
| aluminium | 45 mg/g |
| chlorine | 641 mg/g |

A polymerization test was carried out under identical conditions to those of Examples 1 to 5 using 4 mg of catalytic complex.

144 g of polyethylene was recovered whose melt index is 1.09 g/10 mins. The productivity was therefore 36,000 gPE/g catalytic complex and the specific activity was 88,000 gPE/hr. × g Ti × kg/cm² $C_2H_4$.

EXAMPLES 11 to 14

As in Examples 1 to 5, magnesium ethylate and ethyl aluminium dichloride were used but various derivatives of transition metal were used:

In Example 11, titanium tetraethylate-$Ti(OC_2H_5)_4$;
in Example 12, vanadium oxyoctylate-$VO)OC_8H_{17})_3$;
in Example 13, zirconium tetrabutylate-$Zr(OC_4H_9)_4$; and
in Example 14, a condensed titanium butylate of the average formula:

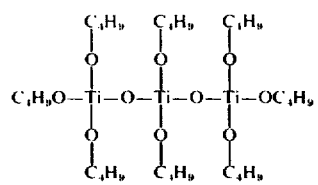

This butylate is heated to 90°C before being used.

114 g of magnesium ethylate was added to varying quantities of the above-mentioned transition metal derivatives. The mixture was heated to 170°C accompanied by agitation for 2½ hours and there was the almost complete dissolution of the magnesium ethylate.

After the mixture was cooled, 400 mls. of hexane at 60°C were added to it and, gradually, varying quantities of ethyl aluminium dichloride in the form of a 400 g/litre solution in hexane.

An exothermic reaction was observed and the formation of a catalytic complex in the form of a precipitate.

The catalytic complex thus formed was separated by filtration, washed with hexane, and then dried in vacuo at 70°C until its weight remains constant.

Polymerization tests were carried out under conditions identical to those of examples 1 to 5.

Table 3 shows the particular conditions for each test as well as the results obtained.

TABLE 3

| | | Ex. 11 | Ex. 12 | Ex. 13 | Ex. 14 |
|---|---|---|---|---|---|
| Nature of the derivative of transition metal | | Ti(OEt)₄ | VO(OOct)₃ | Zr(OBu)₄ | condensed |
| Quantity of this derivative used | g | 114 | 573 | 383 | 253 |
| Atomic ratio Tr/Mg | g-at/g-at | 0.5 | 1 | 1 | 1 |
| Quantity of Al(C₂H₅)Cl₂ used | g | 635 | 635 | 635 | 635 |
| Ratio Al/Mg + Tr | mole/g-eq | 1.25 | 0.71 | 0.83 | 0.83 |
| Elementary analysis of the catalytic complex | | | | | |
| magnesium | mg/g | 90 | 44 | 88 | 60 |
| transition metal | mg/g | 106 | 89 | 181 | 128 |
| aluminium | mg/g | 34 | 73 | 29 | 39 |
| chlorine | mg/g | 539 | 317 | 480 | 408 |

TABLE 3 — Continued

|  |  | Ex. 11 | Ex. 12 | Ex. 13 | Ex. 14 |
|---|---|---|---|---|---|
| Specific surface area of the complex | m²/g | 343 |  | 140 |  |
| Quantity of catalytic complex used | g | 5 | 28 | 20 | 4 |
| Quantity of polyethylene obtained | g | 197 | 84 | 62 | 104 |
| Productivity | gPE/g complex | 39,400 | 3,000 | 3,100 | 26,000 |
| Specific activity | gPE/hr × g Ti × kg/cm² $C_2H_4$ |  37,200 | 3,370 | 1,700 | 20,300 |
| Fluidity index of the PE |  | 0.50 | 0.05 | 0.51* | 0.70 |

*Fluidity index measured under heavy load (21.6 kg).

EXAMPLE 15

The same reagents were used as in Examples 1 to 5 plus zirconium tetrabutylate of formula $Zr(OC_4H_9)_4$.

114 g of magnesium ethylate were mixed with 100 g of titanium tetrabutylate and 153 g of zirconium tetrabutylate. The mixture was heated to 170°C with agitation for 2½ hours and there was almost complete dissolution of the magnesium ethylate. In the mixture the Ti + Zr/Mg atomic ratio was approximately 0.7 to within an error of ± 10% due to impurities in the reagents. The Ti/Zr atomic ratio was approximately 0.75.

To the mixture thus prepared and previously cooled to ambient temperature there was added 400 mls. of hexane at 20°C and then, gradually, 635 g of ethyl aluminium dichloride in the form of a 400 g/litre solution in hexane.

An exothermic reaction occurs with the formation of the catalytic complex in the form of a precipitate. The latter is separated by filtration and washed with hexane. It is then dried in vacuo at 70°C until constant weight.

A polymerization test was carried out under conditions identical to those of Examples 1 to 5 except that the partial pressure of ethylene was 5 kg/cm² and that of hydrogen 2 kg/cm² 6 mg of catalytic complex were used.

61 g of polyethylene were collected having a melt index of 0.44 g/10 mins. The productivity was, therefore, 10,000 gPE/g catalytic complex.

EXAMPLE 16

The catalytic complex was prepared as in Example 3 except that the ethyl aluminium dichloride there used was replaced by diethyl aluminium chloride $Al(C_2H_5)_2Cl$.

The catalytic complex thus formed had the following elementary composition:

| magnesium | 67 mg/g |
|---|---|
| titanium | 92 mg/g |
| aluminium | 92 mg/g |
| chlorine | 385 mg/g |

A polymerization experiment was carried out as in Example 3. 147 g of polyethylene were collected with a melt index of 1.34 g/10 mins. The productivity was therefore 29,400 gPE/g complex and the specific activity was 32,000 gPE/hr × g Ti × kg/cm² $C_2H_4$.

EXAMPLE 17

The catalytic complex was prepared as in Example 3 except that the ethyl aluminium dichloride was replaced by aluminium trichloride. The latter was used in the solid state in an amount of 665 g.

The catalytic complex thus formed had the following elemental composition:

| magnesium | 66 mg/g |
|---|---|
| titanium | 1.6 mg/g |
| aluminium | 96 mg/g |
| chlorine | 713 mg/g |

A polymerization experiment was carried out as in Example 3 using 11 mg of catalytic complex.

17 g of polyethylene of a melt index of 0.08 g/10 mins were collected. The productivity was therefore 1500 gPE/g catalytic complex and the specific activity was 96,500 gPE/hr × g Ti × kg/cm² $C_2H_4$.

EXAMPLES 18 to 24

As in Examples 1 to 5, titanium tetrabutylate and ethyl aluminium dichloride were used. However, in place of the magnesium ethylate there was used one of the following organic oxygenated compounds:
In Example 18, potassium ethylate — $KOC_2H_5$;
in Example 19, calcium ethylate — $Ca(OC_2H_5)_2$;
in Example 20, zinc ethylate — $Zn(OC_2H_5)_2$;
in Example 21, aluminium propylate — $Al(OC_3H_7)_3$;
in Example 22, silicon butylate — $Si(OC_4H_9)_4$;
in Example 23, manganese ethylate — $Mn(OC_2H_5)_2$; and
in Example 24, iron ethylate — $Fe(OC_2H_5)_3$.

Varying quantities of these organic oxygenated compounds were added to 340 g of titanium tetrabutylate. For the rest, the preparation of the catalytic complexes was carried out by the mode of operation described for Examples 1 to 5. The same applies to the polymerization tests.

In order to carry out Example 22, a partially condensed silicon butylate/titanium butylate complex of the commercial type as sold by Dynamit Nobel was used. This complex contained 84 g of titanium and 28 g of silicon per kg.

Table 4 shows the special conditions in each experiment as well as the results obtained.

TABLE 4

| Nature of the compound | | Ex. 18 | Ex. 19 | Ex. 20 | Ex. 21 | Ex. 22 | Ex. 23 | Ex. 24 |
|---|---|---|---|---|---|---|---|---|
| | | $KOC_2H_5$ | $Ca(OC_2H_5)_2$ | $Zn(OC_2H_5)_2$ | $Al(OC_3H_7)_3$ | $Si(OC_4H_9)_4$ | $Mn(OC_2H_5)_2$ | $Fe(OC_2H_5)_3$ |
| Quantity of this compound used | g | 168 | 130 | 155 | 408 | 185 | 145 | 190 |
| Atomic ratio Ti/Me g-at/g-at | | 0.5 | 1 | 1 | 0.5 | 1.75 | 1 | 1 |

TABLE 4—Continued

| Nature of the compound | | Ex. 18 KOC$_2$H$_5$ | Ex. 19 Ca(OC$_2$H$_5$)$_2$ | Ex. 20 Zn(OC$_2$H$_5$)$_2$ | Ex. 21 Al(OC$_3$H$_7$)$_3$ | Ex. 22 Si(OC$_4$H$_9$)$_4$ | Ex. 23 Mn(OC$_2$H$_5$)$_2$ | Ex. 24 Fe(OC$_2$H$_5$)$_3$ |
|---|---|---|---|---|---|---|---|---|
| Quantity of Al(C$_2$H$_5$)Cl$_2$ used | g | 635 | 320 | 635 | 1270 | 635 | 635 | 635 |
| Ratio Al/Me + Ti mole/g-eq | | 0.85 | 0.40 | 0.85 | 1 | 0.45 | 0.85 | 0.70 |
| Elementary analysis of the catalytic complex | | | | | | | | |
| Metal Me | mg/g | 139 | 101 | 140 | — | 12 | 127 | 182 |
| Titanium | mg/g | 83 | 129 | 138 | 209 | 239 | 104 | 92 |
| Aluminium | mg/g | 93 | 17 | 3.9 | 74 | 44 | 19 | 71 |
| Chlorine | mg/g | 623 | 378 | 398 | 517 | 410 | 457 | 377 |
| Specific surface area of the catalytic complex m$^2$/g | | 74 | 10 | 35 | 192 | 50 | 147 | 56 |
| Quantity of catalytic complex used | mg | 30 | 22 | 29 | 20 | 25 | 11 | 51 |
| Quantity of polyethylene obtained | g | 18 | 77 | 25 | 69 | 70 | 55 | 93 |
| Productivity gPE/g complex | | 600 | 3500 | 860 | 3500 | 2800 | 5000 | 1800 |
| Specific activity gPE/hr × g Ti × kg/cm$^2$ C$_2$H$_4$ | | 700 | 2700 | 6200 | 1650 | 1170 | 4760 | 2020 |
| Fluidity index of the PE | g/10 mins | 0.08 | 1.4 | 0.10 | 0.11 | 1.99* | 0.63 | 1.08* |

*Fluidity index measured under heavy load (21.6 kg).

EXAMPLE 25

The same reagents were used as used in Examples 1 to 5 plus aluminium ethylate of the formula Al(OC$_2$H$_5$)$_3$.

114 g of magnesium ethylate were added to 144 g of titanium tetrabutylate mixed with 284 g of aluminium ethylate. The mixture was heated to 170°C with agitation for 2½ hours and it was observed that there was almost complete dissolution of the magnesium ethylate. In the mixture the Ti/Mg + Al atomic ratio was 0.15 gram atom/gram atom to within an error of ± 10% due to impurities contained by the reagents.

To the mixture thus made and previously cooled to ambient temperature there was added 400 mls. of hexane at 20°C and then gradually 635 g of ethyl aluminium dichloride in the form of a 400 g per litre solution in hexane.

This mixture was heated with agitation and under a reflux (approx. 69°C) for 0.75 hours. The Al/Mg + Al + Ti ratio of the mixture was approximately 0.60 moles/gram equivalent. A catalytic complex in the form of a precipitate was formed, separated by filtration, washed with hexane, and then dried in vacuo at 70°C until its weight remains constant.

The elemental analysis of the complex thus formed shows that it contained:

| | |
|---|---|
| magnesium | 47 mg/g |
| titanium | 54 mg/g |
| aluminium | 92 mg/g |
| chlorine | 502 mg/g |

A polymerization test was carried out under conditions identical with those of Examples 1 to 5 using 7 mg of catalytic complex.

155 g of polyethylene were collected having a melt index of 3.04 g/10 mins. The productivity was, therefore, 22,200 gPE/g catalytic complex and the specific activity was 41,000 gPE/hr. × g Ti × kg/cm$^2$ C$_2$H$_4$.

EXAMPLES 26 and 27

The following reagents were used:
magnesium ethylate — Mg(OC$_2$H$_5$)$_2$
aluminium butylate — Al(OC$_4$H$_9$)$_3$
titanium tetranonylate — Ti(OC$_9$H$_{19}$)$_4$
ethyl aluminium dichloride — Al(C$_2$H$_5$)Cl$_2$ 114 g of magnesium ethylate were added to 234 g of aluminium butylate mixed with varying quantities of titanium tetranonylate. The mixture was heated to 190°C accompanied by agitation for 1½ hours and it was observed that there was almost complete dissolution of the magnesium ethylate.

To the mixture thus formed and previously cooled to ambient temperature there was added 6 litres of hexane at 20°C and then, gradually, 635 g of ethyl aluminium dichloride in the form of a 400 g per litre solution in hexane.

This mixture was heated to 65°C with agitation for one hour resulting in the formation of a catalytic complex in the form of a precipitate. It was separated by filtration, washed with hexane, and then dried in vacuo at 70°C until constant weight.

A polymerization test was carried out under conditions identical to those of Examples 1 to 5 except that only 100 mg of triisobutyl aluminium were used.

Table 5 shows the special conditions for each experiment as well as the results obtained.

TABLE 5

| | Ex. 26 | Ex. 27 |
|---|---|---|
| Quantity of Ti(OC$_9$H$_{19}$)$_4$ used g | 31 | 62 |
| Atomic ratio Ti/Mg × Al g-at/g-at | 0.025 | 0.05 |

TABLE 5—Continued

|  | Ex. 26 | Ex. 27 |
|---|---|---|
| Elementary analysis of the catalytic complex | | |
| magnesium mg/g | 67 | 93 |
| titanium mg/g | 15 | 24 |
| aluminium mg/g | 119 | 130 |
| chlorine mg/g | 479 | 438 |
| Specific surface area of the catalytic complex m²/g | — | — |
| Quantity of catalytic complex used mg | 7.2 | 3.3 |
| Quantity of polyethylene obtained g | 132 | 83 |
| Productivity gPE/g complex | 18,400 | 25,200 |
| Specific activity gPE/hr × g Ti × kg/cm² $C_2H_4$ | 122,000 | 105,000 |
| Fluidity index of the PE g/10 mins | 1.02 | 0.52 |

Examples 26 and 27 show that the specific activity is extremely high when the transition metal/metal ratio is between 0.025 and 0.10 gram atom/gram atom.

EXAMPLES 28 to 32

The same reagents as used in Examples 1 to 5 were used except that the magnesium ethylate there used was replaced by:
In Example 28, magnesium phenate — $Mg(OC_6H_5)_2$;
in Example 29, magnesium formate — $Mg(OOCH)_2$;
in Example 30, magnesium benzoate — $Mg(OOCC_6H_5)_2$;
in Example 31, magnesium hydroxymethylate — $Mg(OH)(OCH_3)$; and
in Example 32, magnesium acetylacetonate — $Mg(C_5H_7O_2)_2$.

The catalytic complexes were prepared as in Examples 1 to 5 under the conditions stated in Table 6, except that 1 litre of hexane was used. A complete dissolution of the $Ti(OC_4H_9)_4$ did not result even after the addition of the hexane. On the contrary, a suspension of very fine particles was formed, to which there was added a solution of ethyl aluminium dichloride. Catalytic complexes were obtained analogous to those of the preceding examples. With each of these complexes a polymerization test was carried out under the conditions of Examples 1 to 5.

Table 6 shows the special conditions for each experiment and the results obtained.

76 g of polyethylene were collected having a melt index of 0.59 g/10 mins. The productivity was, therefore, 7600 gPE/g complex and the specific activity was 10,000 gPE/hr. × g Ti × kg/cm² $C_2H_4$.

EXAMPLE 34

The experiment carried out in Example 16 was reproduced except that 8 mg of the same catalyst were used and the 200 mg of triisobutyl aluminium were replaced by 120 mg of diethyl aluminium chloride.

61 g of polyethylene were recovered having a melt index of 0.08 g/10 mins. The productivity was, therefore, 7600 gPE/g complex.

EXAMPLE 35

The same reagents were used as in Examples 1 to 5.

To 500 mls. of a solution of ethyl aluminium dichloride in hexane, at the rate of 400 g/litre, there was added successively 1 litre of hexane and 75 g of titanium tetrabutylate diluted in 100 mls. of hexane. The latter addition was carried out gradually. The temperature of the mixture rose at the end to about 35°C. A precipitate was formed. 36 g of magnesium ethylate, in the solid state, were then added and the mixture was then heated to 60°C with agitation for one hour.

The catalytic complex was filtered, washed with hexane, and then dried in vacuo at 70°C until its weight remained constant.

The elemental analysis of the catalytic complex

TABLE 6

|  | Ex. 28 | Ex. 29 | Ex. 30 | Ex. 31 | Ex. 32 |
|---|---|---|---|---|---|
| Nature of the compound | $Mg(OC_6H_5)_2$ | $Mg(OOCH)_2$ | $Mg(OOCC_6H_5)_2$ | $Mg(OH)OCH_3$ | $Mg(C_5H_7O_2)_2$ |
| Quantity of this compound used g | 210 | 57 | 133 | 36 | 111 |
| Atomic ratio Ti/Me g-at/g-at | 0.5 | 1 | 1 | 1 | 1 |
| Quantity of $Al(C_2H_5)Cl_2$ used g | 635 | 318 | 318 | 318 | 318 |
| Ratio Al/Me + Ti mole/g-eq | 1.25 | 0.85 | 0.85 | 0.85 | 0.85 |
| Elementary analysis of the catalytic complex | | | | | |
| Magnesium mg/g | 99 | 93 | 66 | 45 | 48 |
| Titanium mg/g | 92 | 152 | 126 | 167 | 97 |
| Aluminium mg/g | 39 | 10 | 11 | 27 | 150 |
| Chlorine mg/g | 530 | 395 | 402 | 454 | 168 |
| Specific surface area of the catalytic complex m²/g | — | 111 | 24 | 149 | — |
| Quantity of the catalytic complex used mg | 5 | 7 | 7 | 12 | 32 |
| Quantity of polyethylene obtained g | 126 | 60 | 157 | 60 | 113 |
| Productivity gPE/g complex | 25,200 | 8,600 | 22,400 | 5,000 | 3,500 |
| Specific activity gPE/hr × g Ti × Kg/cm² $C_2H_4$ | 27,400 | 5,530 | 17,500 | 3,050 | 3,600 |
| Fluidity index of the PE g/10 mins. | 0.83 | 0.20 | 2.08 | 0.20 | 0.59 |

EXAMPLE 33

The experiment carried out in Example 1 was reproduced except that 10 mg of the same catalytic complex were used and the 200 mg of triisobutyl aluminium were replaced by 72 mg of trimethyl aluminium.

showed that is contained:

| | |
|---|---|
| magnesium | 111 mg/g |
| titanium | 109 mg/g |
| chlorine | 393 mg/g |

Its specific surface area was 137 m²/g.

A polymerization experiment was carried out under the same conditions as in Examples 1 to 5 except that 100 mg of triisobutyl aluminium were used, the partial pressures of ethylene and hydrogen were 5 and 2 kg/cm², respectively, and 7 mg of catalytic complex were used.

64 g of polyethylene were recovered having a melt index of 0.82 g/10 mins. The productivity amounted to 9100 gPE/g catalytic complex and the specific activity was 16,800 gPE/hr × g Ti × kg/cm² $C_2H_4$.

EXAMPLE 36

A catalytic complex prepared in accordance with Example 12 was used to copolymerize ethylene and propylene.

In a 5-litre autoclave there was placed successively 1.2 g of trihexyl aluminium and 2175 mls. of propylene. It was heated to 40°C whilst introducing ethylene until the total pressure amounted to 18.1 kg/cm². 254 mg of catalytic complex were used.

The polymerization was continued for 6 hours with agitation at 40°C.

At the end of the polymerization the autoclave was degassed and 384 g of an ethylene/propylene copolymer recovered containing 41 moles per cent of propylene.

EXAMPLE 37

A catalytic complex was prepared as in Examples 1 to 5 except that there was used, for 114 g of magnesium ethylate, 680 g of titanium tetrabutylate and 635 g of ethyl aluminium dichloride. The Ti/Mg atomic ratio was, therefore, 2 gram atoms/gram atom to within an error of ± 10%. The Al/Mg + Ti ratio was 0.5 moles/gram equivalent to within ± 10% error.

The catalytic complex was used for a polymerization experiment carried out continuously in a 300-litre reactor of the "liquid-full" type provided with very effective agitation and cooling devices. The cooling device was regulated in such a way as to maintain the temperature in the reactor at 90°C. The polymerization was carried out in suspension in hexane. The latter was introduced continuously into the reactor at the rate of 52 kg/hr.

There was also introduced:

1. Ethylene so as to maintain the concentration in the reactor at 41 g ethylene per kg. of diluent;

2. hydrogen so as to maintain the concentration in the reactor at 0.21 g of hydrogen per kg. of diluent; and 3. trimethyl aluminium so as to maintain the concentration in the reactor at 26 mg of $Al(CH_3)_3$ per kg. of diluent.

The polymer suspension in the diluent was discharged so as to maintain the pressure in the reactor at 30 kg/cm².

6.8 kg of polyethylene per hour were recovered. This polyethylene possessed a density of 0.965 and a melt index of 5.1 g/10 mins. It only contained 2 ppm of titanium originating from catalytic residues even though it did not undergo any purification.

Its Izod impact strength measured according to ASTM Standard D 256 was 10.5 kgcm/cm notch.

By way of comparison a similar polymerization test was carried out but using catalytic complex prepared in accordance with Example 3 of Belgian Pat. No. 767,586.

The special conditions of this comparative experiment were as follows:
rate of feed of hexane: 54.8 kg/hr.;
concentration of ethylene: 34 g/kg. of diluent;
concentration of hydrogen: 0.26 g/kg of diluent; and
concentration of $Al(CH_3)_3$: 17 mg/kg of diluent.

6.7 kg of polyethylene per hour were recovered. This polyethylene had a density of 0.965 and a melt index of 5.8 g/10 mins. It contained 3 ppm of titanium. Its Izod impact strength was only 6.4 kg cm/cm notch.

It will be seen that the catalytic complexes according to the invention make it possible to obtain, with still further improved catalytic activities, polymers which for more or less equivalent melt indices have an Izod impact strength which is distinctly greater than that of the best polymers according to prior art.

It will be understood that it is intended to cover all changes and modifications of the examples of the invention herein chosen for the purpose of illustration which do not constitute departures from the spirit and scope of the invention.

What is claimed is:

1. A process for the polymerization and copolymerization of α-olefins which comprises conducting the polymerization or copolymerization in the presence of a catalyst composition comprising
   A. the solid reaction product of (1) at least one non-halide containing organic oxygenated compound of a metal selected from the metals of Groups Ia, IIa, IIb, IIIb, IVb, VIIa, and VIII of the Periodic Table, with (2) at least one non-halide containing organic oxygenated transition compound of a transition metal selected from the metals of Groups IVa, Va, and VIa of the Periodic Table, and with (3) an organo aluminum halide having the general formula $AlR_nR'_{3-n}$ in which R is a hydrocarbon radical containing 1 to 20 carbon atoms, R' is a halide and n is any number such that $1 \leq n \leq 2$; and
   B. an organo-metallic compound selected from the organic derivatives of metals of Groups Ia, IIa, IIb, IIIb and IVb of the Periodic Table.

2. The process of claim 1 wherein the metal of compound (1) is lithium, sodium, potassium, maagnesium, calcium, zinc, boron, aluminum, silicon, manganese, iron, nickel, cobalt, or tin; and the transition metal is titanium, zirconium, or vanadium.

3. The process of claim 2 wherein the metal is magnesium the transition metal is titanium, and the halide is a chloride.

4. The process of claim 1 wherein two organic oxygenated compounds are used; one of a metal of Group IIa of the Periodic Table and the other a metal of Group IIIb or IVb of the Periodic Table.

5. The process of claim 4 wherein the metal of Group IIa is magnesium and the metal of Groups IIIb or IVb is aluminium or silicon.

6. The process of claim 1 wherein the organic oxygenated compound is an alkoxide, phenate, salt of a carboxylic acid, an enolate, an oximate, salt of a hydroxamic acid, or salt of a hydroxylamine; the organic oxygenated transition compound is an alkoxide, oxyalkoxide, condensed alkoxide or enolate; and the aluminum halide has the general formula $AlR_nR'_{3-n}$ in which R is a $C_1$ to $C_{20}$ alkyl, cycloalkyl, arylalkyl, aryl, or alkylaryl radical, and R' is chlorine.

7. The process of claim 1 wherein the atomic ratio of transition metal present in the organic oxygenated transition compound to metal present in the organic oxygenated compound used in making the complex is between 0.01 and 10 gram atoms per gram atom.

8. The process of claim 7 including an amount of aluminium halide present in preparing the complex such that the ratio between the amount of Al and said metal and transition metal, Al/metal + transition metal, is between 0.01 and 10 moles/gram equivalent.

9. The process of claim 1 wherein the organic oxygenated compound (1) is selected from the group consisting of magnesium alkoxide and magnesium phenate in which the hydrocarbon radical contains from 1 to 6 carbon atoms; the organic oxygenated transition compound (2) is a titanium alkoxide in which the hydrocarbon radical contains from 1 to 10 carbon atoms; the aluminum halide (3) has the general formula $AlR_nR'_{3-n}$ in which R is an alkyl radical containing from 1 to 6 carbon atoms, R' is chlorine and $n = 2$; the ratio of Ti/Mg is between 0.025 and 2; and the ratio Al/Mg+Ti is between 0.50 and 5 moles/gram equivalent.

10. The process of claim 9 wherein the ratio of Ti/Mg is between 0.1 and 2 and the ratio of Al/Mg+Ti is between 0.75 and 2.

11. A process for the polymerization and copolymerization of α-olefins in the presence of a catalytic composition comprising A. the solid reaction product of (1) at least one organic oxygenated compound selected from bivalent metal alkoxides and bivalent metal phenates which possess only sequences of bivalent metal-oxygen-organic radical bonds, with (2) at least one non-halide containing organic oxygenated transition compound of a transition metal selected from the metals of Groups IVa, Va, and VIa of the Periodic Table and with (3) an organo-aluminum halide compound having the general formula $AlR_nR'_{3-n}$ in which R is a hydrocarbon radical containing 1 to 20 carbon atoms, R' is a halide and n is any number such that $1 \leq n \leq 2$; and B. an organometallic compound selected from the organic derivatives of metals of Groups Ia, IIa, IIb, IIIb, and IVb of the Periodic Table.

12. The process of claim 11 wherein the bivalent metal is magnesium, the transition metal is titanium and the halide is a chloride.

13. The process of claim 11 wherein the atomic ratio of transistion metal present in the organic oxygenated transition compound to bivalent metal present in the organic oxygenated compound used in making the complex is between 0.01 and 10 gram atoms per gram atom.

14. The process of claim 11 wherein the organic oxygenated compounds are selected from the group consisting of magnesium alkoxide and magnesium phenates in which the hydrocarbon radical contains from 1 to 6 carbon atoms; the organic oxygenated transition compound is a titanium alkoxide in which the hydrocarbon radical contains from 1 to 10 carbon atoms; the aluminum halide has the general formula of $AlR_nR'_{3-n}$ in which R is an alkyl radical containing 1 to 6 carbon atoms, R' is a chloride and $n = 2$; the ratio of titanium/magnesium is between 0.25 and 2; and the ratio of aluminum/magnesium + titanium is between 0.50 and 5 moles/gram equivalent.

15. The process of claim 11 wherein the ratio of titanium/magnesium is between 0.1 and 2 and the ratio of Al/Mg + Ti is between 0.75 and 2.

* * * * *